3,778,288
METHODS FOR PREPARING MASTER BATCHES OF ADDITIVE CONCENTRATES
Alvin Arthur Ridge and Jack Marquis Polchet, Sasolburg, Republic of South Africa, assignors to South African Coal, Oil and Gas Corporation Limited, Sasolburg, Republic of South Africa
Filed Nov. 15, 1971, Ser. No. 198,814
Int. Cl. C08h 17/04
U.S. Cl. 106—308 Q    6 Claims

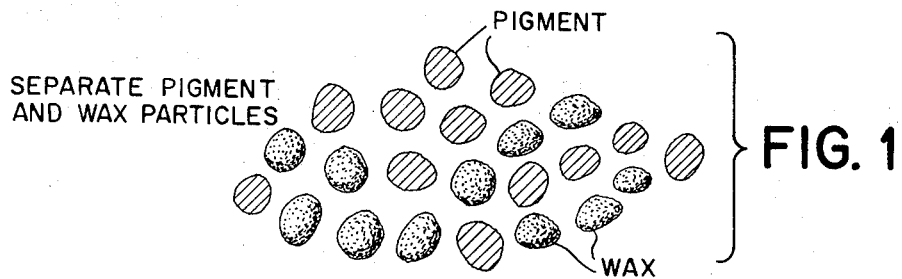
FIG. 1 — Separate pigment and wax particles
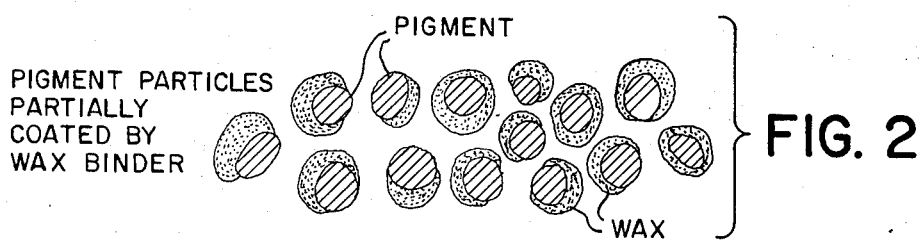
FIG. 2 — Pigment particles partially coated by wax binder
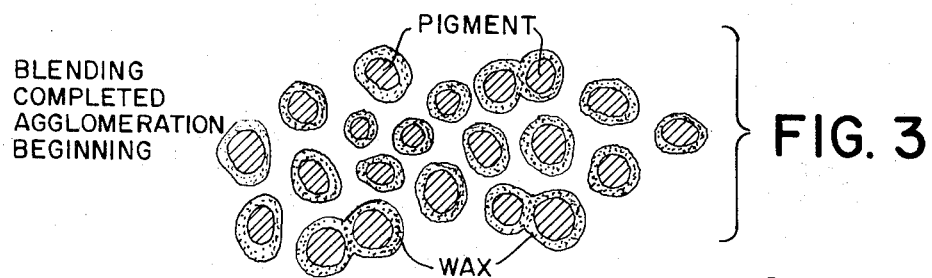
FIG. 3 — Blending completed, agglomeration beginning
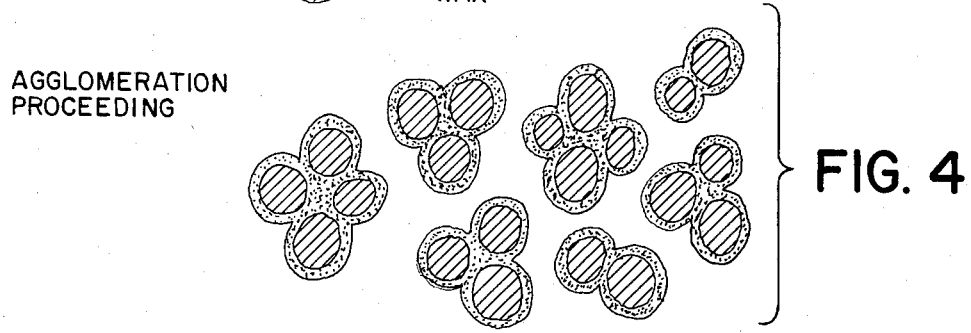
FIG. 4 — Agglomeration proceeding
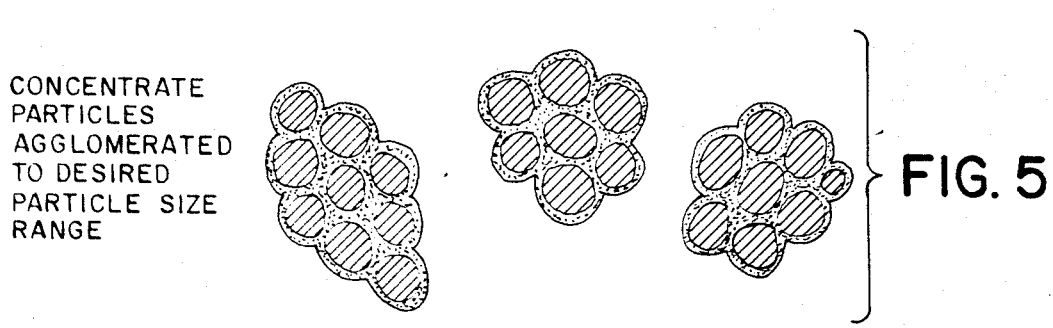
FIG. 5 — Concentrate particles agglomerated to desired particle size range United States Patent Office 3,778,288
Patented Dec. 11, 1973

ABSTRACT OF THE DISCLOSURE

High melt point waxes or their derivatives are intermixed with pigments or other additive compositions in "high speed" mixers of the Henschel type, for example, to form "master batches" of additive concentrates and color concentrates for addition to plastics and/or polymers, resins, waxes, wax-resin mixtures and the like. Mixing temperatures are elevated above room temperature for predetermined mixing times. During mixing, the waxes or wax derivatives soften and coat the additive particles. Concentrate particles are thus formed whose average particle size increases unexpectedly with mixing time, apparently by the operation of a "progressive agglomeration" phenomenon, until the optimum concentrate particle-size is produced. Subsequent size reduction by grinding techniques are partly or wholly eliminated by the methods of the invention, and high quality concentrates with excellent dispersion characteristics are produced.

BACKGROUND OF THE INVENTION

This invention relates to methods for preparing high quality "master batches" of additive concentrates, color concentrates or the like in powdered or granular form for addition to and dispersion in production batches of plastics and/or polymers, resins, waxes, wax-resin mixtures and the like for ultimate use in the manufacture of colored waxes, pigmented resins, sheet, film, extruded plastics and the like.

Coloring of plastics, wax and wax-resin impregnants and crayon and candle wax compositions is well known, but the handling of pigments gives rise to serious problems of contamination caused by air-borne pigment or additive dusts. These are particularly severe in the case of carbon black and other low density organic pigments. Further problems arise from the elaborate and time-consuming cleaning of blending and/or metering equipment which is necessary to prevent contamination when changing from one color to another. Contamination caused by the transfer of pigment dust from one batch of resin to another of a different color is a major problem, particularly in the coloring of plastics.

These severe pigment contamination problems are overcome by the use of "color concentrates" or "master batches" consisting of high concentrations of pigment dispersed in, and bound by, a binder resin of a type similar to the plastic to be pigmented.

These concentrate master batches are widely used in the plastics industry, as well as in the coloring of wax or wax-resin paper-coating compositions and crayon compositions, and in other instances where additive or color concentrates are required.

"Master batches" or "color concentrates" are usually dispersions of the pigment in a resin similar in type to that which is to be colored but at a much higher concentration than is required in the final colored product. They are available in pellets, chips or non-dusting powders which are dry blended, before processing, with virgin resin in the correct proportions to achieve the desired depth of color in the final plastic product.

The binder is conventionally selected to correspond substantially identically with the body of material being colored: e.g., powdered polystyrene binders for concentrates added to polystyrene. However, inadequate pigment dispersion and formulation difficulties have been encountered with many of these binders. In an attempt to reduce pigment dispersion difficulties, it has been established that the shape of the master batch particle is not critical but that its size should be the same as or slightly larger than the resin particles with which it is to be used in order to avoid hopper separation of resin and master batch prior to extrusion or other subsequent treatment.

Color concentrates can be conveyed, blended and metered without fear of contamination of other production lines operating on uncolored resin or on other colors, as there is no possibility of air-borne dust. The solids blending equipment used for mixing the correct quantity of concentrate with virgin resin or the metering device used when the concentrate and the latter are fed, in the correct ratio, directly to the processing machinery, can be very easily and rapidly cleaned when changes of color are required.

Coloring plastics with color concentrates results in a further advantage which derives from the thorough "wetting out" of the pigment by the binder during their manufacture. This results in improved pigment dispersion in the final processing step, e.g. extrusion or injection molding, and hence means the production of more uniformly colored products.

Although selected resins may have suitable mechanical, engineering and chemical properties for fabrication into useful plastic components, these resins are not ideal for use as binders in the pigment dispersion step involved in color concentrate manufacture. Even though such resins become thermoplastic at elevated temperatures, they still exhibit very high viscosities at the highest temperatures at which the resin is still reasonably thermally stable. Dispersion of pigments in such very high viscosity systems raises the viscosity still higher and requires the application of very large energy inputs by means of high powered kneader type mixing machinery. The extensive mechanical working of the resin at elevated temperatures tends to induce degradation of the polymer and hence impair its mechanical properties which may carry through to the final colored component unless the pigment loading in the concentrate is high. It is, however, difficult or impossible to obtain thorough "wetting out" of the pigment at high pigment loadings in these high viscosity systems.

WAX BASED COLOR CONCENTRATES

Many of the problems encountered in color concentrate manufacture which arise from the high melt viscosity of plastic resins can be solved by using high melt point "Fischer Tropsch" hydrocarbon waxes, or their derivatives, as the master batch binder instead of the conventional resin binders. These waxes melt to low viscosity fluids in which the pigment can be adequately dispersed at high pigment loadings with relatively low powered mixing machinery. Such concentrates have been found to have improved pigment dispersing properties, probably due to their relatively low viscosity at plastics processing temperatures. It is well-known that if the minor component of a blend is of lower viscosity than the major component, the time of mixing to homogeneity is shorter than if the viscosity ratio is reversed. Because very high pigment concentrations can be achieved in these concentrates, ranging from 40% up to 90%, only relatively small quantities of wax are introduced into the final colored plastic product. For this reason, no significant adverse effects on processability or mechanical properties of the resin are found when wax based concentrates are used, within the limits of good manufacturing practice. In fact, in many cases a significant lubricating effect is noticeable which results in improved flow of the pigmented resin.

The desirability of using waxes as binders for master batches of pigmented color concentrates or for such other additives as ultraviolet inhibitors, antistatic additives, slip additives and the like has been suggested, for example, in T. G. Hutt's Republic of South Africa patent application No. 68/4,893. For many years, however, a search has been made actively without success for compounding or mixing methods which would produce satisfactory additive dispersion characteristics. Costly and time-consuming melting techniques and grinding techniques were believed to be essential to produce concentrate master batches of proper small particle size exhibiting suitable additive or pigment dispersion.

Thus, for at least ten years a long felt need has existed, and has remained unsatisfied until the methods of this invention were discovered.

Accordingly, a principal object of the invention is to provide additive or color concenrtates and methods for their formulation which are economical and highly effective.

Another object is to provide concentrate master batches achieving excellent dispersion of additives or pigments throughout the material being treated.

A further object is to produce concentrate master batches useful in treating plastics and/or polymers, resins, waxes and wax-resin compositions.

Another object is to provide concentrate formulation methods which minimize the number of formulation operations and simplify the production of concentrate master batches.

Still another object is to provide such concentrate formulation methods utilizing a single jacketed mixing vessel providing high speed mixing at a controlled temperature, taking advantage of progressive agglomeration particle size growth to produce the exact desired range of concentrate particle sizes.

Other and more specific objects will be apparent from the features, elements, combinations and operating procedures disclosed in the following detailed description and shown in the drawings.

THE DRAWINGS

FIGS. 1 through 5 are successive greatly enlarged diagrammatic views showing successive stages in the formulation of a wax-binder pigment concentrate by the method of the present invention.

In brief, the present invention provides high speed mixing methods for blending high melt point waxes with pigments or other additives at a predetermined temperature elevated above room temperature. The methods of this invention apparently take advantage of an unexpected phenomenon observed as mixing proceeds at an elevated temperature. The wax binder first softens and coats or adheres to the powdered pigment or additive particles as indicated in FIGS. 2 and 3; then the wax-coated particles adhere to each other, forming progressively larger "agglomerated" concentrate particles as mixing proceeds, as indicated in FIGS. 4 and 5. By stopping the high speed mixing operation at a predetermined temperature, the desired sizes of concentrate particles are produced automatically, without subsequent grinding steps.

With these methods, master batch binders may comprise high melt point waxes or their derivatives, preferably having melt points above about 135° F., such as Fischer-Tropsch waxes, petroleum waxes, polyethylene waxes, synthetic waxes such as amides and olefins, and other high melt point mineral, vegetable, insect, marine and animal waxes, or the like.

The high melting points and crystallinity of the Fischer-Tropsch hard waxes, and their derivatives, insure that color concentrates based on these materials as the pigment binder have good mechanical properties. They are for example free-flowing, non-balling, non-dusting and able to resist mechanical attrition during handling and blending with virgin resins. By selecting certain waxes or wax blends, excellent concentrates can be prepared which are compatible with the polyolefins (low density polyethylene, high density polyethylene and polypropylene) and with the polystyrenes (crystal, rubber modified and acrylonitrile-butadiene-styrene copolymers). The commonly used inorganic or organic pigments such as titanium dioxide, carbon black, phthalocyamine blues and greens, etc., can be dispersed satisfactorily in these binders at loadings of 50–70%, depending on their oil absorption properties. In some cases, e.g. the phthalocyanine blues, it may be advantageous to use a polar additive with surfactant properties, which may also be a wax, in the binder blend in order to promote "wetting out" of the pigment.

MIXING METHODS

It has been found that the relatively costly kneader type mixer, which operates at high power inputs and relatively low production rates, can be replaced by a high speed or "high intensity" vertical mixer such as the Henschel, Prodex-Henschel or Wellex types for the primary dispersion step where the pigment is "wetted out" by the wax binder. Furthermore, whereas the dough from a kneader must be further processed to form the concentrate into pellets of a suitable size or into a non-dusting powder, this can be achieved directly in the high speed vertical mixer after the dispersion stage.

While the following detailed discussion and specific examples define pigment-bearing color concentrates prepared in the Henschel high speed mixer for use in coloring production batches of plastic resins, it should be understood that other additive compositions may be formed with the various types of high melt point waxes previously enumerated in similar high-speed temperature-controlled mixers utilizing the methods of this invention, and that such additive concentrates produce unexpectedly good additive dispersion in wax and combined wax resin final compositions, as well as in plastic resin compositions used to form molded or extruded plastic parts, components and the like.

A high speed mixer of the Henschel type can produce master batches in the form of 10 to 70 mesh granules with a 90 to 95 percent yield. This particle size is required by the American market for use with metering equipment where the resin and master batch are metered directly to the extruder. In South Africa, where metering devices are not generally used, a larger particle size similar to that of the resin is necessary to prevent separation of the master batch and resin particles in the machine hopper.

Using different operating conditions, the high speed mixer can also produce 5 to 10 mesh granules, but the yield of these particles is only 45 to 50 percent, necessitating the recycling of a large portion of the product.

An alternative to high speed mixing is to extrude the master batch itself and chop it into pellets 3 mm. (1/8") long and 2.5–3 mm. (3/32" to 1/8") in diameter. The yield of pellets is of the order of 90 percent. The cost of the high speed mixing process, however, is considerably lower than that of the extrusion process, where a pre-mixer, extruder, cooling bath and chopper are needed.

An advantage of the extruder is that it produces pellets, which is a shape acceptable for most of the South African plastics users but, on the other hand, it seems a wasteful process to grind these pellets to obtain the free flowing non-dusting product required by the U.S.A. market.

Before extrusion, when formulating additive master batches using conventional extrusion techniques, tumbling of the wax and pigment powders is necessary. However, with very light weight pigments like carbon black, the wax powder settles out in the extruder hopper and a satisfactory master batch cannot be obtained. Instead of tumbling, it has been found that mixing in the Henschel mixer, to a point where the pigment has been coated by the wax, gives a blend with a higher bulk density which extrudes more uniformly and gives a much higher extruder output.

The extruder technique appears to be a suitable way of making the larger size particles required by the South African market, but it is a much more expensive way of working than the Henschel, requiring pre-blending, extruding, cooling, chopping and sieving to remove fines.

Cleaning the extruder is not as simple as with the Henschel but, by raising the barrel temperature, melting the wax and removing the screw, the screw and barrel can easily be wiped clean with a cloth. Displacing one batch of colored material with another is a very wasteful process although on large extruders this may be easier than removing the screw. Wax could be used for cleaning the machine before introducing the new batch.

When formulating master batches with the roll mill, it is necessary to pre-blend the wax and pigment before milling. After milling it is necessary to collect the blend in the form of long rods, cool and then grind to obtain the desired particle size.

Difficulty was experienced with blends containing more than 50 percent titanium dioxide in roll mill blending, and this fact probably eliminates the roll mill from consideration, because most of the titanium dioxide and carbon black blends are required with a loading of 2 parts pigment to 1 part wax.

The use of the high speed mixer is unique in that it can only be used for making master batches with wax or materials with wax-like properties. The capital outlay on this equipment is less than for the Banbury type of equipment needed for making resin master batches, giving wax master batch production a cost advantage over resin master batch production.

Thus, there are many different methods of blending and dispersing pigments with wax to form master batches, but the high speed mixing methods of the present invention are believed to be outstandingly superior. Wax, because of its low viscosity when hot, has a considerable advantage as a master batch binder over the resins, requiring less intensive mixing to obtain a well dispersed master batch which eliminates the need for the expensive Banbury Type equipment required for the resins.

Tests have been carried out successfully using a laboratory scale Henschel high speed mixer (Model FM10L) with a variable speed from 1800 to 3800 r.p.m. and capable of blending about 2 to 3 kg. of material. Except for the lid, the vessel is surrounded by a water jacket used for temperature control. A thermocouple situated at the bottom of the deflector blade is used to measure the temperature of the blend.

Depending on the operating conditions, non-dusting master batches in the form of fine granules, coarse granules or a lump of dough can be made.

This machine is ideally suited to the manufacture of the 10 to 70 mesh granules, giving a 95 percent yield. The oversize particles are sieved and recycled and the 1 to 2 percent of undersized particles which are considered to be non-dusting are left in the product.

The advantage of this machine is that for the 10 to 70 mesh particles the whole operation can be carried out using a single machine and a screen to remove the oversize particles. The pre-blend and particle formation is all carried out in one machine. If the granules are dropped into bags, a cooling stage is necessary to prevent the particles sticking together while warm when the bags are stacked, but if the granules are dropped into drums the cooling is not necessary.

Cleaning the Henschel is very easy, requiring only the removal of the blades and then wiping with a cloth soaked in solvent.

HENSCHEL MIXER MIXING TECHNIQUES

During blending of the wax and pigment in the Henschel mixer, shear heat generated by the high mixing speed partially melts the wax next to the blade. As the temperature of the blend rises, this semi-molten wax comes in contact with and coats the pigment powder, is thrown against the slightly cooler sides of the vessel, and as it rolls round the side it forms round granules, as indicated in FIGS. 2 and 3.

The time taken to form the granules depends mainly on the mixer speed and jacket temperature and, to a much lesser extent, on the charge of material in the machine.

Blends consisting of 1:1, 1:2 and 1:3 parts Sasol H1 Wax:$TiO_2$ and Sasol H1 Wax: carbon black have been prepared, the specifications for the Sasol waxes being set forth below, and these blends were highly successful, giving satisfactory non-crumbling, non-dusting master batches. Satisfactory blends consisting of 1:1 and 1:2 parts Sasol A1 Wax:$TiO_2$ and Sasol A1 Wax:carbon black have also been prepared. Master batches using various colored pigments have been prepared in the Henschel with good results.

The individual components are weighed directly into the machine. No pre-mixing is necessary, and wax in flake form can be used as the flakes are rapidly ground into a powder.

JACKET TEMPERATURE

It is possible to prepare a master batch in the Henschel without warming the jacket, but when using H1 Wax as the pigment binder it takes a long time for the temperature to build up sufficiently for the blend to form granules. Warming the jacket reduces this time, but if the jacket is heated above a certain temperature granules form so rapidly that all the pigment powder has not had time to be bound by the wax and the product is "dusting." Short mixing times generally result in blends that contain pigment dust. The most suitable jacket temperature varies according to the type of pigment, amount of pigment and type of wax being used. When using a new pigment, the jacket temperature has to be selected to give a mixing time of about 10 minutes, after which the pigment particles are substantially fully coated by the wax binder, as indicated in FIG. 3.

As the wax binder softens and coats or adheres to the pigment particles, adjacent coated particles are believed to agglomerate into progressively larger concentrate particles, giving good predictability of final particle size ranges, while avoiding the need for grinding to reduce oversize particles.

The time taken to form the granules is directly dependent on the jacket temperature.

STOPPING TEMPERATURE

With titanium dioxide and certain of the colored pigments, it is possible to run the machine to a specific temperature and obtain high yields of the desired particle size. However, with carbon black it is still necessary to watch the particle growth towards the end of the run and stop when it is judged that the correct size particle has been formed. This is difficult when all the particles are in rapid motion, as they look smaller than they actually are.

As is the case of the jacket temperature variable, the various pigments, depending on their oil absorption characteristics, require different stopping temperatures to obtain a high yield of the correct particle size. Carbon black generally has to be processed at a higher temperature than the other pigments to form granules. Increasing the pigment loading in the wax also necessitates raising the stopping temperature to obtain satisfactory results.

Once granules begin to form, their growth is very rapid and the temperature rises rapidly. Overshooting the stopping temperature by 1° F. can cause the yield of the desired particle size to be reduced by 10 percent.

MIXER SPEED

The higher the mixer speed, the more rapid is the formation of the granules. However, when using speeds of 3,800 r.p.m., the growth of the granules is very rapid and it is difficult to stop at the correct particle size.

Especially when making 7 to 10 mesh particles, it is necessary to run the machine at 1,800 r.p.m. to control the rate of the particle growth.

The use of the high machine speed results in short cycle times, but if the time is too short, the master batch contains unbound pigment dust. Slower operating speeds although taking longer, generally give a better product with less dust.

The diagrammatic views of FIGS. 4 and 5 show successive stages in the agglomeration particle size growth, and FIG. 5 represents the agglomerated concentrate particles grown to the desired particle size range, with the increased size of the concentrate particles and their tendency to adhere together apparently combining to increase the mixing energy absorbed, raising the temperature of the particles. The predetermined stopping temperature is selected to correspond to the desired range of agglomerated concentrate particle sizes.

The preferred jacket temperatures are selected from the range between about 22° C. and about 105° C., depending upon the materials used, as indicated in the examples and tables below. The preferred "end" or "stopping" temperatures are selected from the range between about 57° C. and about 100° C.

Since the preferred wax binders have a melt point at least as high as 135° F. or 57° C., it has generally been found that the stopping temperature should be at least a few degrees higher than 57° C., as shown in the examples and tables to follow.

Following the successful completion of preliminary tests using the laboratory scale Henschel mixer (Model FM10L) blending about 2–3 kg. of master batch, successful pilot plant master batches were mixed in a larger production model Henschel mixer, (Model FM75) with a working capacity of 50 litres.

Good quality color concentrates, containing at least 60 percent pigment (titanium dioxide or carbon black) have been made in acceptable yields of the desired particle sizes on the larger machine.

The scale-up ratio between the laboratory mixer and the small production unit is about 1:20 for titanium dioxide concentrates and about 1:16 for the carbon black type.

MATERIALS USED IN PILOT PLANT TESTS

The titanium dioxide used (Ferro grade 10–120) is a pure material without any additives and the carbon black used (Ferro grade 10–803) is recommended for ultra violet protection of polyethylene. Both pigments were supplied by Messrs. Ferro Enamels, of South Africa. Sasol hard wax (H1) which is inhibited was used for these tests.

From the following bulk densities (TiO$_2$ 0.74 gm./cc., carbon black 0.21 gm./cc. and H1 flakes 0.43 gm./cc.) the weights of the materials were calculated to give a total volume of 50 litres when working with a ratio of 1 part wax to 2 parts pigment.

| | | | |
|---|---|---|---|
| TiO$_2$, kg | 19.8 | Carbon black, kg | 8.4 |
| H1, kg | 9.9 | H1, kg | 4.2 |
| Total weight, kg | 29.7 | Total weight, kg | 12.6 |
| Total volume, litres | 50 | Total volume, litres | 50 |

When the pigment and wax have been compacted, the final volume is much less and, in the case of materials like carbon black with low bulk densities, the final volume is very much less than the initial volume.

"Sasol H1," "Sasol H–4," and "Sasol A–1" hard waxes are Fischer-Tropsch waxes having the following specifications:

"SASOL H–1" OR "PARAFLINT RG"

Specifications

| | |
|---|---|
| Congealing point (° F.) (ASTM D938) | 200–210. |
| Needle penetration, 77° F. (mm./10) ASTM D1321) | 2 maximum. |
| Consistometer hardness, 150° F. (A.U.) (Moore & Munger) | 30–35. |
| Odor (0–4 scale) (ASTM D1833) | 2.5 maximum. |
| Heat stability in glass, 257° F. (hours) (Moore & Munger) | 24 minimum. |
| Oil content (percent) (ASTM D721) | 0.5 maximum. |
| Color, Saybolt (ASTM D156) | 0 minimum. |
| BHT antioxidant (percent) | 0.005 maximum. |

"SASOL H–4" OR PARAFLINT PC WAX

Specifications

| | |
|---|---|
| Congealing point (° F.) (ASTM D938) | 202–207. |
| Consistometer hardness, 150° F. (A.U.) (Moore & Munger) | 25–30. |
| Odor (0–4 scale) (ASTM D1833) | 2.5 maximum. |
| Heat stability in glass, 257° F. (hrs.) (Moore & Munger) | 14 minimum. |
| Oil content (percent) (ASTM D721, modified, MIBK at −25° F.) | 1.5–4.0. |
| F & DA approved antioxidant (percent) | 0.005 maximum. |

"SASOL A–1" OR "PARAFLINT X"

Oxidized Fischer-Tropsch wax, specifications

| | |
|---|---|
| Acid value (mg. KOH/g.) | 25–30. |
| Saponification value (mg. KOH/g.) | 50–65. |
| Needle penetration, 77° F., (mm./10) (ASTM D1321) | 3–8. |
| Softening point, ring & ball (° F.) ASTM E 28) | 194 minimum. |

The yields obtained and the operating conditions used are shown in Table I, for a typical series of runs.

The size of the particles can easily be controlled by the selection of a suitable stopping temperature and the growth rate and time of the run is controlled by the jacket temperature. Particles ranging in size from 10 to 70 mesh, 5 to 10 mesh and up to ¼" were obtained. After sieving, the over and undersized particles were returned to the mixer, ground into a fine powder by running a few minutes at high speed, and then re-formed into the desired size granules.

Batches of each of the titanium dioxide and carbon black color concentrates were made with a particle size varying from ¼ to ½ inch for the purpose of studying their behaviour on grinding. These large particles can be ground down into smaller particles (i.e. 5–10 mesh or 40–100 mesh) to give a high yield of the desired range of particle sizes.

Large size particles will normally have the pigment better dispersed than with the very small particles, due to the fact that with the very small particles there is a chance that not all of the pigment has been coated by the wax and there may still be uncoated pigment on the surface of the particles. In the case of the larger particles, all the pigment has been coated by the wax and the particles have had a longer processing time, with the result that the pigment will be better dispersed.

TABLE I.—YIELDS AND OPERATING CONDITIONS USING MODEL FM 75 HENSCHEL HIGH SPEED MIXER

| | Composition (percent) | | | |
|---|---|---|---|---|
| | H1:TiO$_2$ (33.3:66.6) | H1:TiO$_2$ (33.3:66.6) | H1:CB (40:60) | H1:CB (40:60) |
| Charge, kg | 19.7 | 29.7 | 12.6 | 12.6 |
| Mixer speed, r.p.m | 1,500 | 1,500 | 3,000 | 3,000 |
| Jacket temp., °C | 22 | 22 | 102 | 102 |
| Temp. of CC when stopped, °C | | 67 | 90 | 99 |
| Time taken for run (min.) | 14 | 10 | 9.5 | 14.5 |
| Yield, percent: | | | | |
| +⅛″ | 6.8 | | | 15.7 |
| ⅛″ to ¼″ | 56.5 | | 33.7 | 60.6 |
| ¼″ to 5 mesh | 25.0 | | 35.3 | 18.5 |
| 5 to 10 mesh | 9.5 | 38.2 | 25.4 | 5.2 |
| 10 to 70 mesh | 2.2 | 59.0 | 5.6 | |
| −70 mesh | | 2.8 | | |

NOTE.—CC=Color concentrate; CB=Ferro carbon black grade 10-803.

Henschel high speed mixers are specifically made for the mixing of powders (e.g. blending additives into PVC) and are ideally suited for the purpose of blending wax and pigments. The blades are especially hardened to reduce wear and should have a long life. No sign of wear can be detected on the blades of the small machine after many hours of running with titanium dioxide.

In the case of materials having a low bulk density, the full capacity of the machines can be used but, in the case of materials with a high bulk density, a slightly smaller charge is necessary to allow growth of the granules on the side walls and prevent the formation of a solid lump of material.

As is the case with the small machine, it is necessary to add small quantities of polar waxes or pigment dispersing agents during the manufacture of the color concentrate to obtain the optimum dispersion of the pigment throughout the resin.

The following examples of typical color concentrate master batches formulated in a ten-litre Henschel mixer illustrate a wide variety of pigments and the ranges of color concentrate particle sizes produced by the progressive agglomeration particle growth phenomenon characterizing the methods of this invention:

Example 1—Mixed pigments large agglomerates

Charges:

C-082: 450 grams
    90% H1 Fischer-Tropsch wax
    10% A1 Oxidized Fischer-Tropsch wax
Pigments: 450 grams
    Chromium oxide
    Cadmium lithopone yellow
    Iron oxide
    Titanium dioxide
    Carbon black
    Zinc stearate Jacket temperature °F. _____ 120
Motor speed, r.p.m. _____ 1800
End temperature °F. _____ 149
Time—minutes _____ 18

Yields—Percent

Greater than 10 mesh _____ 49.5
10–20 mesh _____ 38.3
20–40 mesh _____ 10.4
Less than 40 mesh _____ 1.8

Example 2—Red pigment medium agglomerates

Charges:

C-082: 450 grams
    90% H1 Fischer-Tropsch wax
    10% A1 Oxidized Fischer-Tropsch wax
Cadmium Lithopone Red: 450 grams Jacket temperature °F. _____ 106
Motor speed, r.p.m. _____ 1800
End temperature °F. _____ 148
Time—minutes _____ 13

Yields—Percent

Greater than 10 mesh _____ 6.0
10–20 mesh _____ 62.0
20–40 mesh _____ 22.0
Less than 40 mesh _____ 10.0

Example 3—White pigment medium agglomerates

Charges:

C-082: 650 grams
    90% H1 Fischer-Tropsch wax
    10% A1 Oxidized Fischer-Tropsch wax
TiO$_2$: 350 grams Jacket temperature °F. _____ 106
Motor speed, r.p.m. _____ 1800
End temperature °F. _____ 140
Time—minutes _____ 8

Yields—Percent

Greater than 10 mesh _____ 14.5
10–20 mesh _____ 63.3
20–40 mesh _____ 19.9
Less than 40 mesh _____ 2.3

Example 4—Mixed pigment large agglomerates

Charges:

C-082: 500 grams
    90% H1 Fischer-Tropsch wax
    10% A1 Oxidized Fischer-Tropsch wax
Pigment: 500 grams
    TiO$_2$—400 grams, Phthalocyanine green—100 grams Jacket temperature °F. _____ 125
Motor speed, r.p.m. _____ 1800
End temperature °F. _____ 141
Time—minutes _____ 15

Yields—Percent

Greater than 10 mesh _____ 34.7
10–20 mesh _____ 30.0
20–40 mesh _____ 24.4
Less than 40 mesh _____ 10.7

Example 5—White pigment small agglomerates

Charges:

C-082: 234 grams
    90% H1 Fischer-Tropsch wax
    10% A1 Oxidized Fischer-Tropsch wax
TiO$_2$: 666 grams Jacket temperature °F. _____ 121
Motor speed, r.p.m. _____ 1800
End temperature °F. _____ 156
Time—minutes _____ 9.5

Yields—Percent

Greater than 35 mesh _____ 29
35–100 mesh _____ 61
Less than 100 mesh _____ 10

Example 6—Black pigment medium to small agglomerates

Charges:
C–082: 500 grams
  90% H1 Fischer-Tropsch wax
  10% A1 Oxidized Fischer-Tropsch wax
Carbon black: 500 grams

| | |
|---|---:|
| Jacket temperature ° F. | 165 |
| Motor speed, r.p.m. | 1800 |
| End temperature ° F. | 171 |
| Time—minutes | 12 |

Yields—Percent

| | |
|---|---:|
| Greater than 10 mesh | 16 |
| 10–70 mesh | 80 |
| Less than 70 mesh | 4 |

It has thus been discovered that the preparation of wax/pigment color concentrates using a Henschel high speed mixer is a very simple process offering the following advantages.

(a) low capital cost of the equipment involved
(b) relative simplicity of the process
(c) using the same machine, any size granule from 100 mesh up to 6 millimeters or more can be prepared
(d) the ease with which the machine is cleaned when changing from one type of pigment to another
(e) the same machine can be used for grinding down oversize particles
(f) using this process there is no scrap material, as any "off-spec," oversize or undersize material can be returned to the machine and reworked

TYPICAL OPERATING PROCEDURE WITH THE HENSCHEL MIXER

Select a suitable jacket temperature and circulate water through the jacket until the vessel is on temperature. Weigh out the pigment powder and wax and place in the machine. The wax should be in the form of a coarse powder or flakes. Select the desired speed and start the machine. The temperature of the material rises rapidly, remains constant for about 30 seconds and then rises very rapidly. The point where the temperature remains constant is believed to correspond to the completion of blending and beginning of agglomeration particle size growth, as shown schematically in FIG. 3. At this point, the color concentrate has become non-dusting and the inspection cover can be opened. A visual check can then be kept on the growth of the granules. The end of the run can either be determined visually by studying the size of the granules or by stopping at a predetermined temperature. Should the granules not be big enough the machine can be restarted and run for a further 15 to 20 seconds. When the particle size is correct, the color concentrate can be discharged from the machine.

The product as it is discharged consists of a range of particle sizes and requires some form of sieving or screening to obtain the particle size required. Cooling of the product after discharging and before sieving is not necessary.

Over and undersize particles can be recycled with the next batch or preferably kept apart and run as a separate batch. It is, however, necessary that these particles have cooled down to ambient temperature otherwise when placed in the mixer they will not grind down into a fine powder before being reformed into granules.

When making 35 to 100 mesh particles the oversize particles are placed in the mixer and ground for about 1 minute at the low speed. Raising the jacket temperature slightly has been found to reduce the amount of fines produced during the grinding operation. After grinding, screening is again necessary.

The following Table II gives examples of runs that have been carried out using a 10 litre laboratory Henschel high speed mixer and a small production 75 litre machine, showing comparative operationg conditions:

TABLE II

| | Model FM 10L | | | | Model FM 75 | | | |
|---|---|---|---|---|---|---|---|---|
| | Particle size (mesh) | | | | | | | |
| | 35–100 | | 5–10 | | 10–70 | | 5–10 | |
| Pigment | TiO₂ | CB | TiO₂ | CB | TiO₂ | CB | TiO₂ | CB |
| Pigment loading, percent | 66.6 | 50 | 66.6 | 50 | 66.6 | 60 | 66.6 | 60 |
| Charge, kg | 1.8 | 0.7 | 1.8 | 0.74 | 19.7 | 12.6 | 29.7 | 12.6 |
| Mixer speed, r.p.m | 1,800 | 1,800 | 1,800 | 3,800 | 1,500 | 3,000 | 1,500 | 3,000 |
| Jacket temp., ° C | 55 | 74 | 55 | 74 | 22 | 102 | 22 | 102 |
| Temp. of CC when stopped, ° C | 69 | 77 | 71 | 79 | 71 | 90 | 67 | 99 |
| Time taken for run (min.) | 9.5 | 12 | 11 | 10 | 14 | 9.5 | 10 | 14.5 |

Note.—CC=Color concentrate; CB=Carbon black.

When scaling up from a small to a larger machine it is not possible to use exactly the same operating conditions, and it will be necessary to make adjustments to suit the particular machine and pigments that are being used.

Example 6

A specific example of the operating procedure used for the manufacture of a 5 to 10 mesh color concentrate containing 66.7 percent titanium dioxide on a 75-litre machine is as follows:

(a) Weigh out 13.1 kg. TiO₂; 5.9 kg. H4 and 0.7 kg. Al (total 19.7 kg.). With TiO₂ less than 50 L are charged.
(b) Circulate water at 22° C. through the jacket and wait until the vessel reaches this temperature.
(c) Charge the wax and pigment to the vessel.
(d) Run at 1500 r.p.m.
(e) At 55° C. the inspection cover can be opened and the growth of the granules observed. (A light or torch is useful for this purpose.)
(f) Stop running when the temperature of the material reaches 67° C.
(g) Discharge the product and sieve through 5 and 10 mesh sieves.
(h) Retain the over and under size particles, cool to room temperature and when sufficient of the material has been collected; charge 19.7 kg. to the machine and run at 3000 r.p.m. for 1 minute to grind the particles into a fine powder. (Continue as from Step (e).)

OPERATING CONDITIONS FOR THE HIGH SPEED MIXING OPERATION

The operating conditions depend on many variables. They will vary depending on the type of pigment, on the pigment loading in the color concentrate, and on the particle size of the product. The following is therefore only a guide to the selection of the optimum operating conditions for each size of the machine and the type of pigment used.

Charge of material

The quantity of pigment and wax should of course be such that the volume of material does not exceed the maximum operating volume for the machine. This will vary depending on the density of the pigment being used and on the pigment to wax ratio of the color concentrate.

In the case of a pigment with a high density such as TiO₂ it is advisable to charge less material to the machine, otherwise during the stage when the wax and pigment begin to compact there is not sufficient heat transfer to the sides of the vessel and problems with the formation of a cake can be encountered.

Adding too small a quantity of material to the machine results in poor mixing due to there being insufficient material in the intensive mixing zone.

Mixer speed

Larger Henschel mixers generally only have two speeds. When starting to make a color concentrate with a new pigment it is advisable to start using the low speed and if no granules have formed after a reasonable time to change to the high speed.

The higher the speed used the more rapid will be the formation and growth of the granules. At the high speed the granules grow very rapidly and it may be difficult to control the particle size.

Jacket temperature

The lowest jacket temperature should be selected to form granules in a reasonable short time. If the temperature is too low, granules will not form; if too high, granules will form rapidly and it is difficult to control the size of the particles.

When conducting tests with a 75-litre machine it was found necessary to use cooling water of 22° C. in the jacket when working with $TiO_2$. However, using the same machine with carbon black the jacket required heating.

Temperature of mix

When making a series of batches of the same color concentrate, a suitable stopping temperature can be selected to give a high yield of the desired particle size. A variation of 0.5° C. can cause a change in the yield. When working according to a selected temperature it is not necessary to watch the growth of the granules and the blend can be stopped at the selected temperature. This provides the possibility of making the system automatic.

Yield

As has already been stated a range of particle sizes is produced when making color concentrates on the Henschel. Depending on the operating conditions a high yield of the desired range of particle sizes can be obtained. However, to obtain the maximum possible yield, careful control of the operating conditions is necessary. Operating at too high a jacket temperature, too high a mixer speed or stopping too soon or too late reduces the desired yield considerably.

It is possible to improve the yield significantly as more experience is obtained with a particular machine and pigment.

Formulation

The formulation must be selected to suit the requirements of the final product. However, depending on the oil absorption properties of the pigment (i.e. the wetting of the pigment by the wax) there are certain maximum amounts of pigment that can be bound and adequately dispersed in the wax. With pigments that disperse easily in a resin, a high pigment loading can be used; whereas, with pigments that are difficult to disperse, lower pigment loadings must be used. The lower the pigment loading in the wax, the better the initial dispersion will be. The following figures give a rough guide to pigment concentrations that have been found satisfactory. $TiO_2$ 70%; phthalocyanine blue 60%; carbon black 50 to 60%.

Since the foregoing description and drawings are merely illustrative, the scope of the invention has been broadly stated herein and it should be liberally interpreted to secure the benefit of all equivalents to which the invention is fairly entitled.

What is claimed is:

1. A method of preparing an agglomerated additive concentrate incorporating high melt point wax binder particles adhering to powdered additive particles agglomerated into multi-particle granules comprising the steps of:
   (A) blending said additive particles with at least 10 weight percent of said high melt point wax particles in a high speed mixing operation performed in a temperature-controlled mixing vessel maintained at an elevated blending temperature while the temperature of the material being blended rises until a temperature "plateau" is reached,
   (B) and continuing said high speed mixing operation in the same temperature-controlled mixing vessel until the temperature of the material within the vessel rises further to a predetermined stopping temperature above the melting point of the wax selected to correspond to the granule size range desired for said agglomerated multi-particle granules.

2. The method defined in claim 1 wherein said blending step is performed for a period of time sufficient to cause said high melt point wax particles to adhere to substantially all of said additive material particles.

3. The method defined in claim 1, wherein said elevated blending temperature in step A is selected from the range between about 22° C. and about 100° C.

4. The method defined in claim 1, wherein said stopping temperature is selected from the range between about 57° C. and about 120° C.

5. The method defined in claim 1, wherein at least 90% of said agglomerated multi-particle granules fall within a desired granule size range between 10 mesh and 70 mesh screens.

6. A method of preparing an agglomerated additive concentrate incorporating high melt point wax binder particles adhering to powdered additive particles agglomerated into multi-particle granules comprising the steps of:
   (A) blending said additive particles with at least 10 weight percent of said high melt point wax particles in a high speed mixing operation performed in a temperature-controlled mixing vessel maintained at an elevated blending temperature while the temperature of the material being blended rises,
   (B) and continuing said high speed mixing operation in the same temperature-controlled mixing vessel until the temperature of the material within the vessel rises to a predetermined stopping temperature above the melting point of the wax selected to correspond to the granule size range desired for said agglomerated multi-particle granules.

References Cited

UNITED STATES PATENTS

| | | | |
|---|---|---|---|
| 2,838,413 | 6/1958 | Young | 106—272 |
| 3,353,974 | 11/1967 | Trimble et al. | 106—308 Q |
| 3,661,607 | 5/1972 | Hurley | 106—272 |
| 3,607,337 | 9/1971 | Eisenmenger et al. | 106—308 Q |

DELBERT E. GANTZ, Primary Examiner

J. V. HOWARD, Assistant Examiner

U.S. Cl. X.R.

106—272, 309

UNITED STATES PATENT OFFICE
CERTIFICATE OF CORRECTION

Patent No. 3,778,288     Dated December 11, 1973

Inventor(s) Alvin Arthur Ridge and Jack Marquis Polchet

It is certified that error appears in the above-identified patent and that said Letters Patent are hereby corrected as shown below:

Column 3, line 22, "concenrtates" should be -- concentrates --

Column 4, line 11, "phthalocyamine" should be -- phthalocyanine --

Column 10, line 2 of Example 5, "C-082 - 234 grams" should be
-- C-082 - 334 grams --

Signed and sealed this 16th day of April 1974.

(SEAL)
Attest:

EDWARD M. FLETCHER, JR.
Attesting Officer

C. MARSHALL DANN
Commissioner of Patents